(12) United States Patent
Kumar

(10) Patent No.: US 6,224,033 B1
(45) Date of Patent: *May 1, 2001

(54) PROPORTIONAL SOLENOID-CONTROLLED FLUID VALVE ASSEMBLY

(75) Inventor: Viraraghavan S. Kumar, Palm Bay, FL (US)

(73) Assignee: Teknocraft, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,757

(22) Filed: Mar. 28, 2000

Related U.S. Application Data

(63) Continuation of application No. 08/988,369, filed on Dec. 10, 1997, now Pat. No. 6,047,947, which is a continuation-in-part of application No. 08/632,137, filed on Apr. 15, 1996, now Pat. No. 5,785,298.

(51) Int. Cl.[7] .................................................. F16K 31/02
(52) U.S. Cl. ............................... 251/129.16; 251/129.18; 335/279
(58) Field of Search ........................ 251/129.15, 129.16, 251/129.18; 335/261, 279, 281

(56) References Cited

U.S. PATENT DOCUMENTS

| | | | |
|---|---|---|---|
| 3,368,791 | * | 2/1968 | Wells ........................... 251/129.16 X |
| 4,579,145 | * | 4/1986 | Leiber et al. ............... 251/129.16 X |
| 4,767,097 | * | 8/1988 | Everett et al. ................... 251/129.08 |
| 5,066,980 | * | 11/1991 | Schweizer ......................... 335/279 X |
| 5,110,087 | * | 5/1992 | Studtmann et al. ............. 251/129.16 |
| 5,131,624 | * | 7/1992 | Kreuter et al. .............. 251/129.16 X |
| 5,240,227 | * | 8/1993 | Sich ................................. 251/129.16 |
| 5,427,352 | * | 6/1995 | Brehm ........................ 251/129.16 X |
| 5,447,288 | * | 9/1995 | Keuerleber et al. ........ 251/129.16 X |
| 5,462,253 | * | 10/1995 | Asthana et al. ............. 251/129.16 X |
| 5,516,076 | * | 5/1996 | Stobbs et al. ................... 251/129.16 |
| 5,547,165 | * | 8/1996 | Brehm et al. ................... 251/129.16 |
| 6,047,947 | * | 4/2000 | Kumar ............................ 251/129.16 |

* cited by examiner

*Primary Examiner*—John Rivell
(74) *Attorney, Agent, or Firm*—Allen, Dyer, Doppelt, Milbrath & Gilchrist, P.A.

(57) ABSTRACT

A proportional solenoid-driven valve control assembly contains a moveable, magnetic armature positioned adjacent to one end of a fixed pole piece that protrudes from a solenoid bore and is supported by means of a pair of flat suspension springs adjacent to the one end of the bore. The movable armature is configured to provide two generally cylindrical radial magnetic flux paths. One flux path traverses a radial gap at one end of fixed magnetic pole piece that protrudes from the one end of the solenoid bore. The other flux path traverses a generally cylindrical gap between a rim portion of the armature and an inwardly projecting magnetic element of the solenoid housing. The two radially separate cylindrical gaps function as coaxial guide air-bushings for the moveable magnetic armature that prevent off-axis play between the moveable armature and the pole piece and the inwardly projecting magnetic element.

7 Claims, 4 Drawing Sheets

PROPORTIONAL SOLENOID-CONTROLLED FLUID VALVE ASSEMBLY

CROSS-REFERENCE TO RELATED APPLICATION

This is a Continuation of application Ser. No. 08/988,369, filed Dec. 10, 1997, now U.S. Pat. No. 6,047,947, which is a continuation in part of application Ser. No. 08/632,137, filed Apr. 15, 1996, now U.S. Pat. No. 5,785,298, issued Jul. 28, 1998.

FIELD OF THE INVENTION

The present invention relates in general to solenoid-operated fluid control valves of the type used in precision fluid flow regulation systems, such as those that require precise control of the rate of fluid flow, including but not limited to pneumatic and hydraulic regulation. The invention is particularly directed to an improved variation of the solenoid-driven valve control structure described in the '137 application, through which fluid flow through a fluid flow-regulating valve assembly may be controlled in proportion to the application of solenoid current.

BACKGROUND OF THE INVENTION

As described in my earlier filed '137 application, precision fluid flow control devices, such as those used in fuel supply units for aerospace systems and oxygen/air metering units employed in hospitals, as non-limiting examples, typically incorporate a solenoid-operated valve for controlling fluid flow substantially proportional to the current applied to the solenoid. It is also desirable that hysteresis in the flow rate versus control current characteristic (which creates an undesirable dead band in the operation of the valve) be maintained within some minimum value.

A standard practice for reducing hysteresis has been to physically support the solenoid's moveable armature within the bore of its surrounding drive coil by means of low friction bearings, such as Teflon rings. However, even with the use of such a low friction material, there is still significant 'dead band' current (e.g. on the order of forty-five milliamps), which limits the operational precision of the valve.

One proposal to deal with this physical contact-created hysteresis problem is to remove the armature support mechanism from within the bore of the solenoid coil (where the unwanted friction of the armature support bearings is encountered) to an end portion of the coil, and to support the armature for movement within the bore by means of a spring mechanism located outside of the solenoid coil.

An example of such a valve configuration is described in the U.S. Pat. No. 4,463,332, to Everett, issued Jul. 31, 1984. Pursuant to this patented design, the valve is attached to one end of an armature assembly supported for axial movement within the cylindrical bore of the solenoid coil and having a permanent ring magnet surrounding the solenoid. One end of the solenoid contains a ring and spring armature support assembly, located substantially outside the (high flux density) solenoid bore, and whose position can be changed, so as to adjust the axial magnetic flux gap within the bore and thereby the force applied to the valve.

Disadvantageously, however, this type of support structure requires a magnetic flux booster component which, in the patented design, is a permanent magnet. Namely, even though the objective of the Everett design is to adjust magnetic permeance and maintain linearity, the overall solenoid structure and individual parts of the solenoid, particularly the ring spring armature assembly (which itself is a complicated brazed part), and the use of a permanent booster magnet, are complex and not easily manufacturable with low cost machining and assembly techniques, resulting in a high price tag per unit.

In another prior art configuration, described in the U.S. Pat. No. 4,635,683, to Nielsen, the movable armature is placed outside the bore by means of a plurality of spiral spring-shaped bearings adjacent to opposite ends of the solenoid structure. Unfortunately, this structure is costly to manufacture, as it not only places a complicated and movable return spring structure in the interior of the solenoid bore, but requires precision attachment of the spring bearings at multiple spaced apart locations of the housing adjacent to opposite ends of the solenoid.

The linear motion proportional solenoid assembly described in my U.S. Pat. No. 4,954,799 entitled: "Proportional Electropneumatic Solenoid-Controlled Valve," improves on the above designs by using a pair of thin, highly flexible annular cantilever-configured suspension springs, to support a moveable armature within the bore of solenoid, such that the moveable armature is intimately coupled with its generated electromagnetic field (thereby eliminating the need for a permanent magnet as in the Everett design, referenced above).

In order to make the force imparted to the movable armature substantially constant, irrespective of the magnitude of an axial air gap between the armature and an adjacent magnetic pole piece, my patented structure places an auxiliary cylindrical pole piece region adjacent to the axial air gap. This auxiliary cylindrical pole piece region has a varying thickness in the axial direction, which serves to 'shunt' a portion of the magnetic flux that normally passes across the axial gap between the armature assembly and the pole piece element to a path of low reluctance. By shunting the flux away from what would otherwise be a high reluctance axial path through a low reluctance path, the auxiliary pole piece region effectively 'linearizes' the force vs. air gap characteristic over a prescribed range.

The proportional solenoid structure described in my earlier filed '137 application, and diagrammatically illustrated in FIGS. 1 and 2, reduces the structural and manufacturing complexity of the implementation of my previously patented structure by locating a moveable, magnetic armature 10 adjacent to one end of a fixed pole piece 12 that protrudes outside a solenoid coil bore 14, and configuring this moveable armature 10 to provide two, relatively low reluctance magnetic flux paths 21 and 22.

The first flux path 21 is a radially directed flux path through an annular air gap 31 at one end 16 of fixed magnetic pole piece 12. This annular shaped air gap results from the fact that the radially projecting, tapered rim portion 34 of the movable armature 10 has an interior diameter that is only slightly larger than the diameter of the end 16 of the fixed magnetic pole piece 12 protruding beyond the one end of the solenoid bore 14. This allows for relative axial translation between the movable armature 10 and the fixed magnetic pole piece 12 as moveable armature 10 is axially translated by energizing a solenoid coil 11. Since annular air gap 31 is very short, fixed radial distance, the magnetic flux path between the end 16 of the fixed pole piece 12 and armature 10 is a substantially constant, low magnetic reluctance radial path.

The second flux path 22 is also essentially a radial flux path through a variable geometry annular air gap 32 between a radially projecting, tapered rim portion 34 of moveable armature 10 and an inwardly projecting tapered portion 36 of the solenoid assembly housing 30. Because the thickness of each of the mutually opposing surfaces of the tapered rim portion 34 of the moveable armature 10 and the inwardly projecting rim portion 36 of the housing 30 is tapered to an annular wedge shape at the variable geometry air gap therebetween, the magnetic field characteristic between the armature and the housing becomes saturated at each of mutually adjacent tapered rim portions 34 and 36.

Consequently, the magnetic flux through the armature is principally confined in the radial direction, by-passing the substantial reluctance path along an axial air gap 23 between the moveable armature 10 and the lower end 16 of the fixed pole piece 12. This causes the force imparted by the solenoid on movable armature 10 to vary in proportion to the applied current, so that displacement of moveable armature 10 against the bias of an axial compression spring 40 varies in proportion to solenoid current.

When employed in a fluid flow application, the proportional solenoid assembly of my '137 application may include an armature retainer 25 threaded into the moveable armature 10, and mechanically coupled with a valve poppet 55 of a valve unit 50. The armature retainer 25 and the movable armature 10 capture interior radius portions of a pair of spiral suspension springs 41 and 42, mutually spaced apart by a spacer 44 of non-magnetic material, and supporting the axially moveable armature 10 outside solenoid bore 14. The valve poppet 55 engages a valve seat 56 and thus controls the flow of fluid between fluid input port 51 and a fluid exit port 52 of the valve unit 50, with displacement of the movable armature 10 along the solenoid assembly axis A being proportional to solenoid current.

Now although the proportional solenoid structure described in my '137 application has been found to operate extremely well in relatively small and larger sized hardware configurations, for very small (e.g., micro-valve) applications and using reasonable priced industry standard materials, I have observed that distortion of one or more components of the assembly may occur, as the parts—especially the moveable armature's support springs 41 and 42—become very small and dimensionally thin.

In particular, I have observed that, for very small dimension applications, what would otherwise be a negligible axial magnetic flux component accompanying the dominant radial flux component bridging the variable geometry radial air gap 32 between the saturated tapered rim portion 34 of the moveable armature 10 and the inwardly projecting tapered portion 36 of the solenoid assembly housing 30 becomes significant. By significant is meant that, absent the use of relatively expensive, mechanically robust (composite or metallurgically exotic) materials, such as titanium alloys and the like, the small amount of non-radially directed magnetic flux in the variable geometry air gap 32 is sufficient to overcome the mechanical rigidity of the material (e.g., brass) of the armature support springs 41 and 42, and causing the springs to warp or twist from their intended shape, and thereby deviate from their normal axial cantilever flexing along axis A.

This unwanted distortion of the armature support springs is particularly likely where there are non-trivial departures from dimensional tolerances in the manufacturing of the parts of the solenoid assembly. Because of the variable geometry gap inherently tends to provide some degree of play between the armature and the housing, distortion of the armature support springs can cause an unbalanced physical engagement of the tapered rim portion of the moveable armature with the inwardly projecting tapered portion of the housing, thereby impairing or preventing proper operation of the proportional solenoid assembly.

SUMMARY OF THE INVENTION

In accordance with the present invention, this component distortion problem is effectively remedied, by modifying the configuration of the moveable armature to eliminate the variable geometry annular air gap between the radially projecting, tapered rim portion of the moveable armature and the inwardly projecting tapered portion of the solenoid assembly housing, while still retaining their flux control functionality. For this purpose, the moveable armature of the improved proportional solenoid assembly architecture of the present invention employs a moveable armature that is configured to prevent play between the armature and adjacent magnetic material with which it is magnetically coupled, and also prevents the establishment of an axial flux path that might otherwise distort/twist the intended shape of the armature support springs, and thereby cause an unwanted and off-axis engagement of the moveable armature with the interior projection of the housing.

Pursuant to the present invention, an armature retainer is configured to be coupled to a valve poppet for controllably closing against a valve seat of a fluid flow path within a valve unit. The armature retainer is threaded into the interior bore of an axially translatable, magnetic armature, and is configured to retain therebetween an inner ferrule-shaped spacer and interior portions of a pair of spiral-configured suspension springs. Outer portions of the suspension springs and an associated ferrule spacer are captured at an end portion of the housing where it engages the valve unit.

The moveable magnetic armature has a generally cylindrical shape, including a cylindrical body portion, and a generally disc-shaped rim portion, which surrounds and is solid with the cylindrical body portion. Projecting from the disc-shaped rim portion is a ferrule-shaped portion, having a distal end tapered in the axial direction. The interior diameter of the ferrule-shaped portion of the moveable armature is slightly larger than the outer diameter of a cylindrical end of a longitudinal shaft portion of a fixed magnetic pole piece, which protrudes from the lower end of a bore of a solenoid coil. The slightly larger interior diameter of the ferrule-shaped portion of the moveable armature allows relative axial translation between the armature and the stationary magnetic pole piece as the armature is axially translated by the application of current to the solenoid coil.

The disc-shaped rim portion of the magnetic armature is magnetically coupled with a cylindrically shaped rim portion projecting inwardly from an interior annular ledge element of magnetic material installed to the interior cylindrical sidewall of the housing. As a consequence, an annular or cylindrical air gap is formed at each of a pole piece-coupling region and a housing-coupling region of the moveable armature. Because these two air gaps are annular (defined by spaced apart cylindrical walls of adjacent magnetic components), the moveable armature is constrained to only axial movement, which prevents distortion of the suspension spring members.

A further, step-shaped annular ring of non-magnetic material is installed atop the annular ledge element and supports the fixed magnetic pole piece within the solenoid bore. The step-shaped annular ring is sized to provide a cavity into which the lower end of the fixed magnetic pole piece protrudes, and which accommodates axial displacement of the ferrule-shaped portion of the magnetic armature.

Since the interior of the ferrule-shaped portion of the magnetic armature is cylindrically shaped, a low reluctance annular air gap for magnetic flux is formed between the cylindrical end of the fixed magnetic pole piece and the moveable armature, irrespective of the relative axial separation between the moveable armature and the fixed pole piece. As the distal end of the ferrule-shaped projection of the armature is tapered in the axial direction, it becomes immediately saturated in the course of diverting magnetic flux that would otherwise pass across the axial gap between the end of the pole piece and the moveable armature.

The mutually opposing surfaces of the armature's rim portion and the rim portion of the ledge member form a constant radius annular air gap therebetween. Therefore, irrespective of the relative axial separation between the moveable armature and the fixed pole piece, the flux path between the fixed pole piece and the armature is always radially directed across a low reluctance annular air gap.

Since the outer annular air gap is also very short and of a fixed radial distance, the magnetic flux path between the armature's rim portion and the rim portion of the annular ledge member is also a substantially constant, low magnetic reluctance radial path. Namely, similar to the solenoid assembly of my '137 application, the substantial reluctance of the axial air gap between the movable armature and the fixed pole piece, in combination with the relatively low reluctance in the radial direction across the two annular air gaps, effectively confines magnetic flux in the annular air gap regions, by-passing the axial air gap. This by-passing of what would otherwise be a high reluctance axial path enables the dual cylindrical air gap moveable armature configuration of the invention to effectively linearize the force vs. air gap characteristic of the proportional solenoid assembly, as desired, but without causing distortion of the suspension springs.

Locating both of the annular air gaps outside the solenoid bore dispenses with the need for a non-magnetic spacer, which is conventionally welded to magnetic elements, is obviated, in order to maintain all of the non-magnetic and magnetic elements in coaxial alignment during the manufacturing process, normally entails the use of precision fixtures.

DETAILED DESCRIPTION

Figure 1:
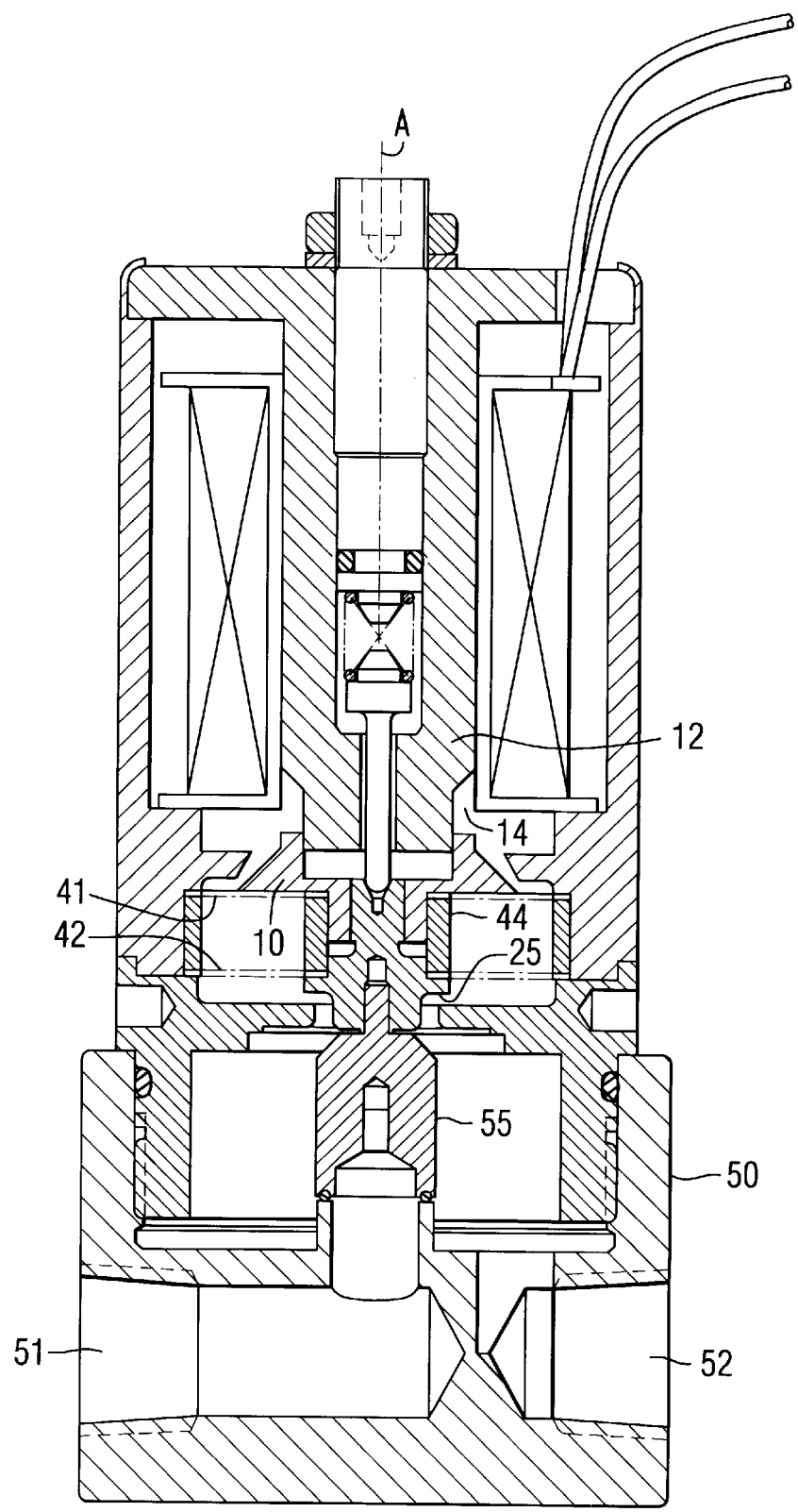
FIG. 1 is a longitudinal, cross-sectional diagrammatic illustration of a proportional solenoid-controlled fluid valve assembly disclosed in my co-pending '137 application.
Figure 2:
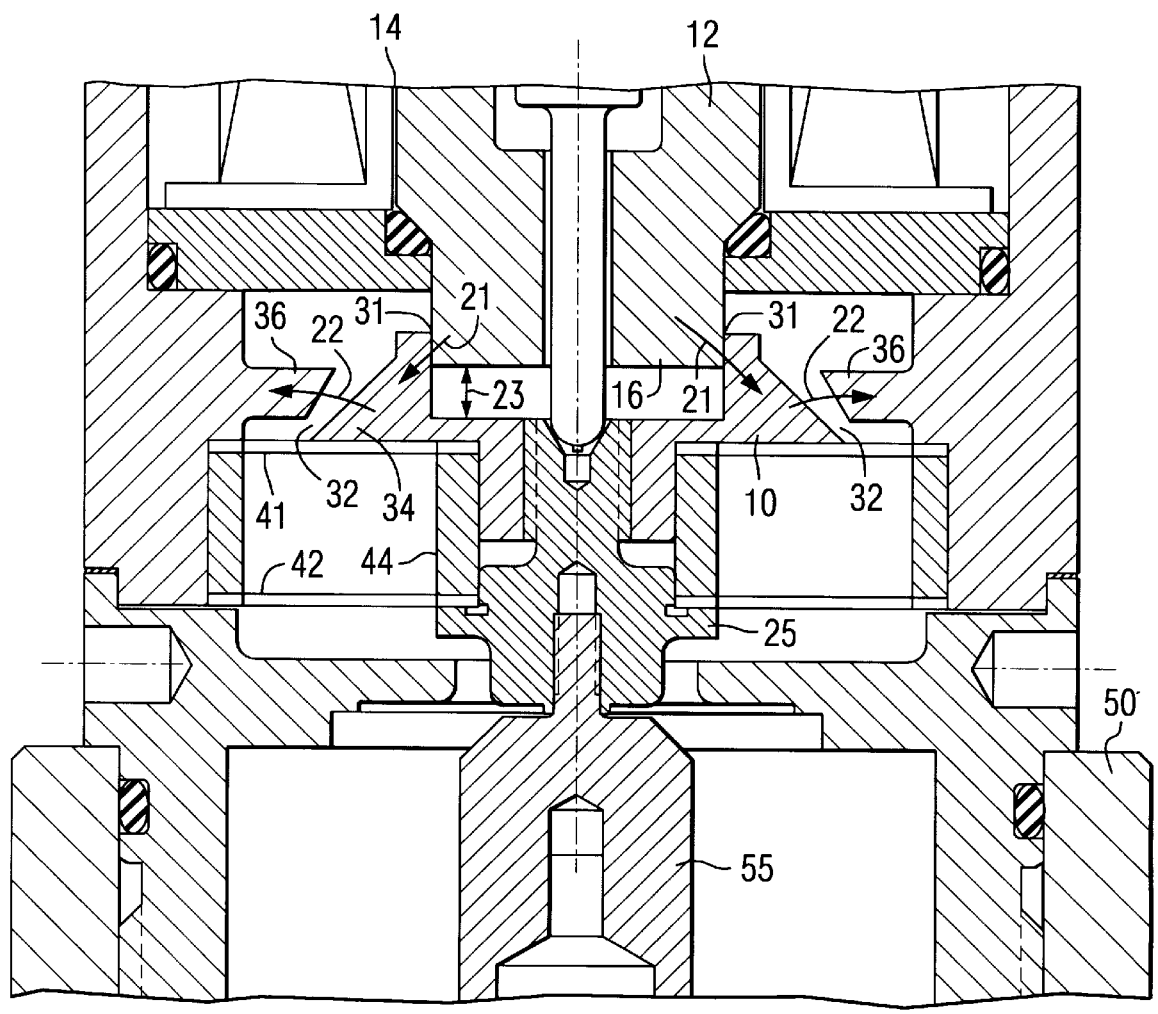
FIG. 2 is an enlarged view of a portion of FIG. 1.
Figure 3:
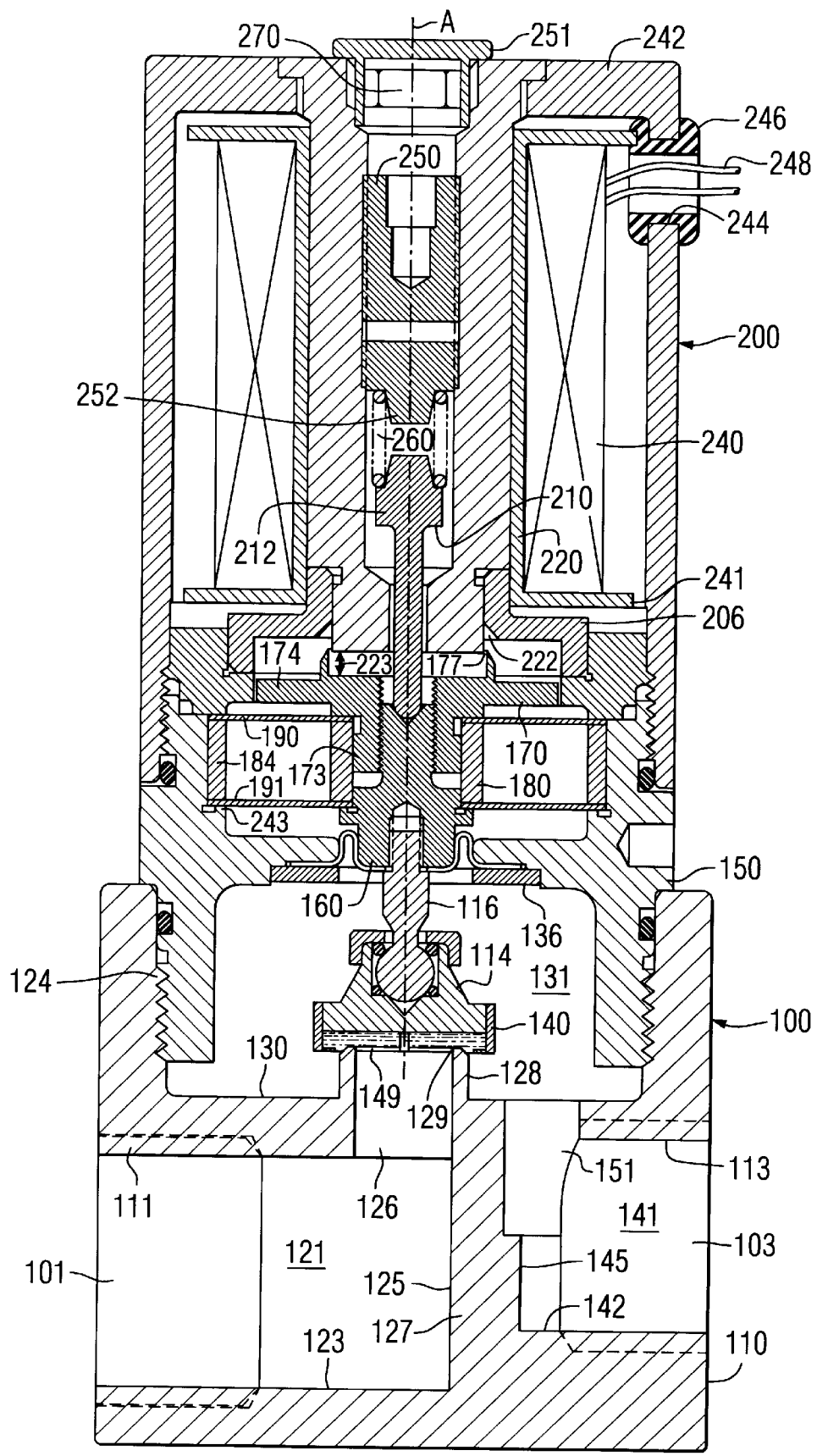
FIG. 3 is a longitudinal, cross-sectional diagrammatic illustration of a proportional solenoid-controlled fluid valve assembly in accordance with the present invention.
Figure 4:
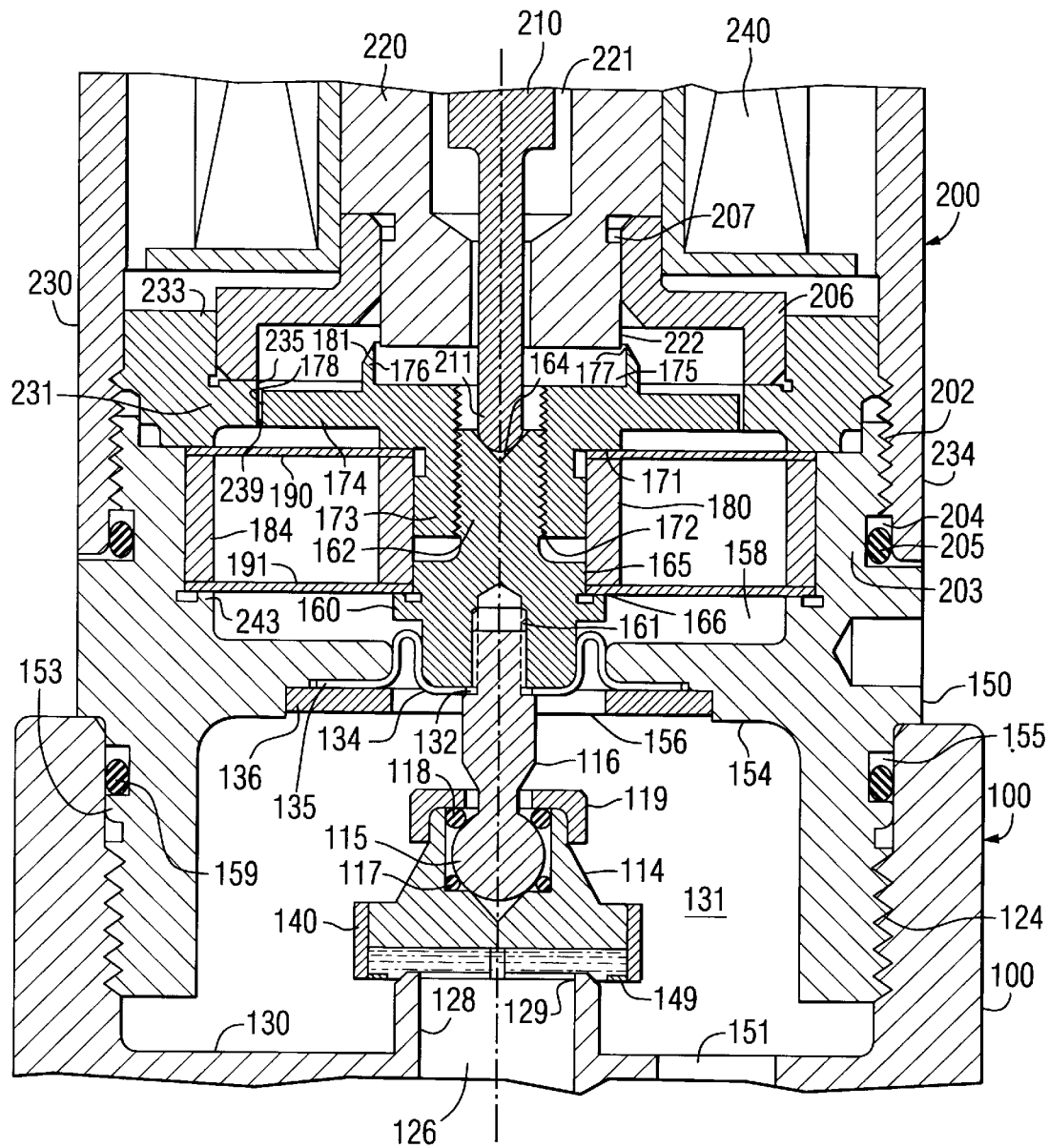
FIG. 4 is an enlarged view of a portion of FIG. 3.

Referring now to the drawings, FIG. 3 shows a longitudinal, cross-sectional diagrammatic illustration of a proportional solenoid-controlled fluid valve assembly embodying the present invention, while FIG. 4 is an enlarged view of a portion of FIG. 3, showing the improved moveable armature configuration in greater detail. Unless otherwise indicated, the respective components of the fluid valve assembly of FIGS. 3 and 4 are, like those of the assembly of FIGS. 1 and 2, cylindrically symmetric about an axis of symmetry A.

The proportional solenoid-controlled fluid valve assembly of the present invention is diagrammatically illustrated as including a valve unit 100 of non-magnetic material, such as stainless steel, and a solenoid unit 200, comprised of magnetic material such as magnetic steel, which is mechanically joined with valve unit 100 for controlling its operation. The valve unit 100 is configured substantially as the valve unit 50 of FIG. 1, and comprises a generally cylindrical base member 110 having a fluid input port 101 into which fluid, the flow rate of which is to be regulated, is introduced, and a fluid exit port 103 from which the fluid exits the valve unit 100. Fluid input port 101 and fluid exit port 103 may be internally threaded, as shown at 111 and 113, respectively, so that valve unit 100 may be installed between respective sections of fluid transporting conduit, not shown.

Within cylindrical base member 110, input port 101 opens into a first generally cylindrical bore 121, which is bounded by a cylindrical sidewall 123 and a first side 125 of an interior end wall 127. output port 103 opens into a second, generally cylindrical bore 141, which is bounded by cylindrical sidewall 142 and terminates at a second side 145 of the interior end wall 127. Interior end wall 127 is solid and terminates with a circular valve seat 129 at the bottom 130 of a generally cylindrical cavity 131 in the generally cylindrical base member 110.

The valve seat 129 terminates a cylindrical valve bore wall 128, having a generally cylindrical bore 126 which intersects the bore 121, so as to provide a closeable fluid communication path between fluid input port 101 and cavity 131. Valve seat 129 is sized to be closed by the lower face 149 of a valve poppet 140. The valve poppet 140 includes a generally conical poppet body portion 114, that is secured to a ball-shaped end 115 of a poppet stem 116 by a pair of O-rings 117 and 118 and a threaded ring member 119. An upper end of the valve poppet stem 116 is threaded so that it may engage a threaded axial bore 161 of a generally cylindrically shaped armature retainer 160.

A generally cylindrical bore 151 extends from the bottom 130 of cavity 131 and intersects the bore 141 adjacent to the second side 145 of interior end wall 127, thereby providing a fluid transport path between cavity 131 and exit port 103. The valve unit 100 further includes a generally hollow, cup-shaped valve body member 150, which is configured to be threaded into the threaded cylindrical sidewall 124 of cylindrical base member 110, so as to close the cavity 131, to which bores 126 and 151 extend.

Valve body member 150 has a generally annular interior end wall 154 having a bore 156, which provides communication with a generally cylindrical recess 158 on the opposite side of end wall 154. Bore 156 is sized to accommodate axial translation of the lower end of moveable armature retainer 160. An exterior sidewall portion 153 of valve body member 150 has a circular recess 155, which is sized to receive an O-ring 159, to provide a fluid-tight seal between valve body 150 and the cylindrical base member 110, when the two are threaded together. An interior region 132 of a flexible fluid tight sealing member 134 is captured between the poppet stem 116 and the armature retainer 160, while an outer perimeter region 135 of sealing member 134 is captured between a ring 136 and the valve body 150.

The armature retainer 160 has an externally threaded nose end 162, which is sized to be threaded into the interior bore 172 of an axially translatable, magnetic armature 170. Armature retainer 160 further includes a cylindrical wall portion 165, which is sized to receive an inner spring-retaining, ferrule-shaped spacer 180, and a flat, rim portion 166, which extends radially from and is solid with cylindrical wall portion 165. By threading the nose end 162 of the armature retainer 160 into the interior bore 172 of moveable magnetic armature 170, first and second spiral-configured suspension springs 190 and 191, adjoining and mutually spaced apart by spacer 180, are captured between a rear or lower face 171 of the magnetic armature 170 and the rim portion 166 of the armature retainer 160.

The nose end 162 of armature retainer 160 has a recess 164, which is sized to accommodate a distal end 211 of an armature-biasing axial pin 210, installed within an interior axial bore 221 of a fixed magnetic pole piece 220, that is supported within a generally cylindrical magnetic housing 230. As in the assembly disclosed in my '137 application, the armature-biasing axial pin 210 provides an externally calibrated spring bias force along the axis A against the armature 170, so as to establish the amount of force required to translate armature away from its valve-closing position.

The improved moveable magnetic armature 170 of the present invention has a generally cylindrical shape, including a cylindrical body portion 173, through which threaded interior bore 172 passes, and a generally disc-shaped rim portion 174, which surrounds and is solid with the cylindrical body portion 173. Extending outwardly from the disc-shaped rim portion 174 of the magnetic armature 170 is a tubular or ferrule-shaped projection 176. A distal end 181 of the projection 176 is tapered or has a varying thickness in the axial direction.

The interior recess or hollow region 175 of the ferrule-shaped projection 176 of the moveable armature has a diameter that is slightly larger than the outer diameter of a cylindrical end 222 of the fixed magnetic pole piece 220, which protrudes from the lower end of a bore of a solenoid coil 240, wound on a bobbin 241. The slightly larger interior diameter of the ferrule shaped projection 176 of the moveable armature 170 allows relative axial translation between the armature 170 and the stationary magnetic pole piece 220, as the armature 170 is axially translated by the application of current to the solenoid coil 240.

The disc-shaped rim portion 174 of the magnetic armature 170 is magnetically coupled with a cylindrically shaped rim portion 231 projecting inwardly from an interior annular-shaped ledge element 233 of magnetic material installed (e.g., welded) to the interior cylindrical sidewall of the housing 230. A further step-shaped annular ring 206 of non-magnetic material (e.g., brass) sits atop annular ledge element 233 and supports fixed pole piece 220 within the solenoid bore. The step-shaped annular ring 206 is sized to provide a cavity 207, into which the lower end 222 of the fixed magnetic pole piece 220 protrudes and which accommodates axial displacement of the ferrule-shaped projection 176 of the magnetic armature 170.

Because the tapered ferrule-shaped projection 176 of the magnetic armature 170 is cylindrically shaped, a low reluctance annular air gap 177 for magnetic flux is always formed between the cylindrical end 222 of fixed magnetic pole piece 220 and the armature 170, irrespective of the relative axial separation 223 between the armature 170 and the pole piece 220. In addition, the fact that the distal end 181 of the ferrule-shaped projection 176 of the armature 170 is tapered, or has a varying thickness in the axial direction, causes this portion of the armature to become immediately saturated in the course of its diverting magnetic flux that would otherwise pass across the axial gap 223 between the end of the pole piece 220 and the moveable armature 170. This is similar to the radial shunting functionality of the auxiliary cylindrical pole piece region described above with reference to my U.S. Pat. No. 4,954,799, for linearizing the force vs. air gap characteristic of the solenoid assembly, except that the entire flux path through the fixed pole piece 220 radially traverses the annular shaped projection 176 of the moveable armature 170, rather than also bridging the axial gap 223 between the pole piece 220 and the moveable armature 170.

As shown in the enlarged partial view of FIG. 4, the mutually opposing surfaces 178 and 235, respectively, of the armature's rim portion 174 and the rim portion 231 of ledge element 233 form a constant radius annular air gap 239 therebetween. As a consequence, irrespective of the relative axial separation 223 between the moveable armature 170 and the fixed pole piece 220, the flux path between the fixed pole piece 220 and the armature 170 is radially directed—across the annular air gap 239.

As with ferrule-shaped projection 176 of the moveable magnetic armature 170, this allows for relative axial translation between the movable armature 170 and the fixed magnetic pole piece 220, as the moveable armature 170 is axially translated. Because the outer annular air gap 239 is also very short and of a fixed radial distance, the magnetic flux path between the armature's rim portion 174 and rim portion 231 of annular ledge element 233 is also a low magnetic reluctance radial path. Thus, like the solenoid assembly of my '137 application, the substantial reluctance of axial air gap 223 between the moveable armature 170 and the end pole piece 220, in combination with the relatively low magnetic reluctance in the radial direction across annular air gaps 177 and 239, effectively confines magnetic flux in the annular air gap regions, by-passing the axial air gap 223.

In addition, as described previously, the fact that each of the two air gaps 177 and 239 has a cylindrical shape—being defined by spaced apart cylindrical walls of adjacent magnetic components—serves to constrain movement of the moveable armature 170 in the axial direction only, preventing potential off-axis distortion of the suspension spring members 191 and 192, which might otherwise impair proper control of the valve. This desired axial direction constraining action is reinforced by the fact that one of the air gaps (air gap 177) is located at a relatively inner diameter region of the moveable armature, while another of the air gaps (air gap 239) is located at a relatively outer diameter region of the moveable armature. In effect, these radially separate cylindrical air gaps function as coaxial guide air-bushings that prevent off-axis play between the moveable armature and both the fixed pole piece 220 and the surrounding ledge element 233, so that the distortion problem, discussed above, is prevented.

As in the assembly disclosed in my '137 application, both annular air gaps 177 and 239 are located outside the solenoid bore dispenses with the need for a non-magnetic spacer, which is normally welded to magnetic elements, is obviated, in order to maintain all of the non-magnetic and magnetic elements in coaxial alignment during the manufacturing process, normally entails the use of precision fixtures.

Further, since the armature-supporting suspension springs 190 and 191 are captured at an end portion 234 of the housing 230, where the valve body 150 engages the housing at a threaded joint 202, both suspension springs 190 and 191 and the translatable magnetic armature 170 supported thereby are outside the lower end of the solenoid bore from which the stationary pole piece 220 protrudes. A sidewall portion 203 of valve body member 150 has an annular recess 204, which is sized to receive an O-ring 205, providing a fluid-tight seal between the valve body 150 and housing 230, when the two are threaded together.

To securely capture suspension springs 190 and 191, the valve body member 150 includes an interior annular ledge 243 having a radius and axial length that are sized to receive and capture an outer spring-retaining, ferrule-shaped spacer 184, together with outer edge portions of the suspension springs 190 and 191, between ledge 243 of the valve body member 150 and the interior annular ledge element 233. Adjacent to a generally disc-shaped end portion 242 of the housing is a sidewall aperture 244 having a grommet 246 through which leads 248 pass for providing electrical connection between solenoid coil 240 and a current control source, not shown.

In order to calibrate the solenoid actuator, namely, calibrate the amount of force required to axially translate armature 170 along axis A, in a direction away from the valve unit 100, where poppet 140 is urged against and closes the valve seat 129, a threaded cylindrical shaft member 250 is threaded into an upper region of the axial bore 221 of the fixed pole piece 220, and covered by a protective cap 251. A nose portion 252 of shaft member is sized to fit within one end of a compression spring 260, which has an opposite end captured upon the nose portion 212 of armature-biasing pin 210. The degree to which shaft member 250 is threaded into the axial bore 221 of the fixed pole piece 220 establishes an axially directed spring-bias against armature 170, and thereby against the valve seat 129 by poppet 140. A lock nut 270 may be threaded onto an externally threaded end portion of shaft member 250 to prevent further rotation of shaft member 250, once the shaft member has been rotated in bore 221 of the fixed pole piece 220 to establish the desired valve opening force.

In operation, with the solenoid actuator calibrated by rotation of the shaft member 250 in the manner described above, fluid flow between fluid input port 101 and fluid exit port 103 is established by controlling displacement of the poppet 140 relative to valve seat 129, in linear proportion to the current supplied to solenoid winding 240. With a fluid supply coupled to input port 101, translating poppet 140 away from its closure position against valve seat 129 allows the fluid to enter fluid flow cavity 131 and flow therefrom through bore 151 to outlet bore and fluid exit port 103.

When the solenoid 140 is energized, the magnetic flux of the resulting magnetic field follows a closed path through the pole piece 220, translatable armature 170, the annular ledge element 233 and housing 230. As described above, the magnetic flux path through armature 170 comprises two regions: 1—a radial shunt path portion across the low reluctance annular air gap 177 between the cylindrical wall portion of the cylindrical end 222 of the fixed magnetic pole piece 220 and the tapered ferrule-shaped projection 176 of armature 170; and 2—the constant radius annular air gap 239 between the mutually opposing surfaces 178 and 235, respectively, of the armature's rim portion 174 and the rim portion 231 of ledge element 233.

As described above, the substantial magnetic reluctance of the axial air gap 223 between the moveable armature 170 and the pole piece 220 does not effectively contribute to the flux path. The resulting magnetic field characteristic causes axial displacement of the armature 170 and therefore poppet 140, which establishes fluid flow through the valve unit 100, to be proportional to the energization current applied to the solenoid winding 240.

As will be appreciated from the foregoing description, by modifying the configuration of the moveable armature employed in the structure disclosed in my '137 application to include a dual cylindrical air gap armature that replaces the variable geometry annular air gap between the radially projecting, tapered rim portion of the moveable armature and the inwardly projecting tapered portion of the solenoid assembly housing, the proportional solenoid structure of the present invention effectively remedies the problem of component distortion that may be encountered in very small (e.g., micro-valve) applications, without having to use relatively expensive materials.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A proportional solenoid assembly comprising:
   a solenoid coil having a longitudinal axis and a bore coaxial therewith, and being operative to produce a magnetic field;
   a housing in which said solenoid coil is placed, said housing containing magnetic material for providing a flux path for said magnetic field produced by said solenoid, and including a radial projection toward an interior portion of said housing;
   a magnetic pole piece disposed within and having a protrusion end of a diameter no greater than the diameter of and protruding from said coaxial bore of said solenoid coil; and
   a movable armature of magnetic material, supported for axial translation relative to said magnetic pole piece and having a projection portion that contains an interior recess of a diameter slightly larger than an outer diameter of said protrusion end of said magnetic pole piece and forming, with said protrusion end of said magnetic pole piece, a first axial gap that is effective to minimize an axial magnetic flux path between said moveable armature and said magnetic pole piece, and a second, generally cylindrical gap radially magnetically coupled with said protrusion end of said magnetic pole piece, and a rim portion forming a third, generally cylindrical gap radially magnetically coupled with said radial projection of said housing, such that, during relative axial translation between said projection portion of said movable armature and said magnetic pole piece, and during relative axial translation between said rim portion of said movable armature and said radial projection of said housing, magnetic flux is directed in a radial direction across said second and third cylindrical gaps, by-passing said first axial gap, and wherein a distal end of said projection portion is tapered.

2. A proportional solenoid assembly according to claim 1, wherein said moveable armature is supported for axial translation relative to said magnetic pole piece by means of a suspension spring arrangement supported external to said solenoid bore.

3. A proportional solenoid assembly according to claim 2, wherein said suspension spring arrangement comprises spaced apart flat suspension springs coupled to said moveable armature and supported external to said solenoid bore.

4. A proportional solenoid assembly according to claim 1, wherein said projection portion of said moveable armature has a generally tubular configuration surrounding said protrusion end of said magnetic pole piece.

5. A proportional solenoid assembly according to claim 1, further including a valve unit, coupled with the movable armature of said proportional solenoid controller and being operative to regulate fluid flow between a fluid input port and a fluid exit port.

6. A proportional solenoid assembly according to claim 5, wherein said rim portion of said armature and said projection portion of said housing are configured such that displacement of said armature by application of current to said solenoid causes fluid flow through said valve unit to vary in proportion to said energization current.

7. A proportional solenoid assembly according to claim 5, wherein said valve unit comprises a base member having a fluid cavity coupled in fluid communication with said fluid input and fluid exit ports and containing a valve seat, which is closed by a valve poppet that is coupled with said moveable magnetic armature.

* * * * *